United States Patent
Sasaki et al.

(10) Patent No.: US 9,250,678 B2
(45) Date of Patent: Feb. 2, 2016

(54) INFORMATION PROCESSING APPARATUS, AND COMPUTER-READABLE STORAGE MEDIUM HAVING STARTUP/SHUTDOWN CONTROL PROGRAM STORED THEREIN

(75) Inventors: Hiroshi Sasaki, Kyoto (JP); Yutaka Murakami, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1372 days.

(21) Appl. No.: 12/750,339

(22) Filed: Mar. 30, 2010

(65) Prior Publication Data

US 2011/0055539 A1  Mar. 3, 2011

(30) Foreign Application Priority Data

Aug. 31, 2009  (JP) .................................. 2009-200330

(51) Int. Cl.
*G06F 1/32* (2006.01)
*G06F 9/44* (2006.01)
*G06F 1/26* (2006.01)

(52) U.S. Cl.
CPC ................ *G06F 1/3203* (2013.01); *G06F 1/26* (2013.01); *G06F 1/3287* (2013.01); *G06F 9/4401* (2013.01); *G06F 9/4406* (2013.01); *Y02B 60/1282* (2013.01)

(58) Field of Classification Search
CPC ....... G06F 1/26; G06F 1/3203; G06F 1/3287; G06F 9/4401; G06F 9/4406; G06F 11/1417; G06F 11/1441; Y02B 60/1278; Y02B 60/1282
USPC .................................................. 713/300–324
See application file for complete search history.

(56) References Cited

U.S. PATENT DOCUMENTS

| 5,269,022 | A | 12/1993 | Shinjo et al. |
| 6,226,740 | B1 | 5/2001 | Iga |
| 7,120,811 | B1 * | 10/2006 | Bingi et al. .................... 713/324 |
| 2003/0120912 | A1 * | 6/2003 | Sasaki et al. ....................... 713/2 |
| 2005/0071697 | A1 * | 3/2005 | Batchelor et al. .............. 713/300 |
| 2006/0098512 | A1 * | 5/2006 | Tanaka et al. .................. 365/229 |
| 2006/0212727 | A1 * | 9/2006 | Judge et al. .................... 713/300 |
| 2006/0248327 | A1 * | 11/2006 | Chang et al. ....................... 713/2 |
| 2008/0086591 | A1 * | 4/2008 | Miyajima ...................... 711/104 |
| 2008/0180564 | A1 * | 7/2008 | Yamaji ........................... 348/372 |

FOREIGN PATENT DOCUMENTS

| JP | 3-265027 | 11/1991 |
| JP | 7-44325 | 2/1995 |
| JP | 9-297659 | 11/1997 |

(Continued)

*Primary Examiner* — Dennis M Butler
(74) *Attorney, Agent, or Firm* — Nixon & Vanderhye, P.C.

(57) ABSTRACT

An information processing apparatus includes a nonvolatile memory, a volatile memory, and a process control section. A startup program to be required when starting up the information processing apparatus has previously been stored in the nonvolatile memory. When a command to start up the apparatus is received, it is determined whether or not the startup program is present in the volatile memory. When the startup program is absent, the startup program is loaded from the nonvolatile memory into the volatile memory. Thereafter, when a command to turn off the power of the information processing apparatus is received, supply of power to other components of the information processing apparatus than the volatile memory is stopped while maintaining supply of power to the volatile memory, thereby to shutdown the power of the information processing apparatus.

11 Claims, 6 Drawing Sheets

(56) References Cited

FOREIGN PATENT DOCUMENTS

| | | |
|---|---|---|
| JP | 2772103 | 4/1998 |
| JP | A-H11-184703 | 7/1999 |
| JP | 2000-207814 | 7/2000 |
| JP | 2006-171987 | 6/2006 |
| JP | 2006-293647 | 10/2006 |
| JP | 2006-309782 | 11/2006 |
| JP | 2006-344059 | 12/2006 |
| JP | 2007-38580 | 2/2007 |
| JP | 2007-156855 | 6/2007 |
| JP | A-2008-9742 | 1/2008 |
| JP | 2008-307837 | 12/2008 |
| WO | WO 02/095556 | 11/2002 |
| WO | WO 2009/055394 A2 | 4/2009 |

* cited by examiner

INFORMATION PROCESSING APPARATUS, AND COMPUTER-READABLE STORAGE MEDIUM HAVING STARTUP/SHUTDOWN CONTROL PROGRAM STORED THEREIN

CROSS REFERENCE TO RELATED APPLICATION

The disclosure of Japanese Patent Application No. 2009-200330, filed on Aug. 31, 2009, is incorporated herein by reference.

BACKGROUND OF THE INVENTION

1. Field of the Invention

The present invention relates to an information processing apparatus, and more particularly, to reduction in startup time of the information processing apparatus.

2. Description of the Background Art

Conventionally, there has been proposed a technique of storing, in a nonvolatile memory, a part of data required for startup of a computer device in order to reduce startup time of the computer device, as disclosed in Japanese Patent Laid-open Publication No. 7-044325. (hereinafter referred to as Patent Document 1), and Japanese Patent Laid-open Publication No. 2006-309782 (hereinafter referred to as Patent Document 2).

The technique disclosed in Patent Document 1. is aimed at reducing startup time from when a disk storage device is powered on to when it becomes accessible from a computer, and at reducing access time for every reading/writing of data. A nonvolatile memory such as an EPROM is incorporated, in association with an internal processor, in the disk storage device. Stored in the nonvolatile memory are configuration data (addresses in the disk which are required for loading a DOS and the like, the number of cylinders used in the disk, the number of so-called retries on the reading/writing operation, and the like) which are required when loading, into the computer, a basic program OS in the disk. Then, in parallel with an operation to cause the disk to start rotation at the time of starting up the disk storage device, the configuration data are read from the nonvolatile memory into the processor within a time shorter than the disc startup time. As a result, after the startup of disk rotation is completed, the computer can immediately access the basic program in the disk.

Further, in a device disclosed in Patent Document 2, a nonvolatile memory (flash memory) is provided in an HDD. At initial installation of an OS, an OS startup program is stored in the nonvolatile memory. Thereafter, when the system is powered on, ROMBIOS initializes the HDD. Thereby, the startup program stored in the flash memory is read out, transferred to the system body via a system bus, and loaded into a main memory. Conventionally, when the HDD is initialized after the power-on of the system, a spindle motor provided in the HDD is driven. When the spindle motor reaches a steady speed, the startup program is read from the disk and transferred to the system body, and thereby the system is started up. On the other hand, according to the technique disclosed in Patent Document 2, since the startup program, which has conventionally been read from disc, is stored in the flash memory provided in the HDD, it is not necessary to wait until the spindle motor in the HDD reaches the steady speed after the power-on of the system, and thus the startup time of the system is reduced.

Meanwhile, there has been proposed a technique of reducing startup time of a personal computer device by reducing time required for so-called POST (Power On Self Test) process, as disclosed in International Publication WO 02/095556 (hereinafter referred to as Patent Document 3). In the technique disclosed in Patent Document 2, when a user of the personal computer device performs an operation to shut down an OS, a BIOS does not immediately turn off power of the device but restarts the device by software reset, and executes POST. When the POST is completed, the BIOS stores, in a volatile memory, the state of the device just before starting startup of the OS, and causes the device to enter a standby mode as a power-saving mode. At next startup of the device, the BIOS skips execution of the POST and performs only a process for restoring the device from the power-saving mode, thereby immediately starting up the OS. Thus, the startup time of the device can be reduced.

However, the above-described devices have the following drawbacks. First of all, in the devices disclosed in Patent Document 1. and Patent Document 2, the data required for startup are stored in the nonvolatile memory. Use of the nonvolatile memory causes the following problems. First, the reading speed of the nonvolatile memory, such as an NAND flash memory, is generally higher than that of a hard disk but lower than that of a volatile memory. Further, since the nonvolatile memory is a rewritable device, data stored in the nonvolatile memory are low in reliability because a hacker or a cracker can illegally rewrite the data. Further, data destruction might occur depending on the number of rewritings of the nonvolatile memory, which also causes reduction in reliability. Furthermore, in order to secure the reliability, a process for checking the reliability and consistency of data is required when the data are read. As a result, the reading takes more time.

In the technique disclosed in Patent Document 3, the personal computer device is caused to enter the power-saving mode with the result of the POST being stored in the volatile memory, thereby reducing the next startup time. However, for example, when the configuration of the personal computer device is changed during the power-saving mode (for example, when a peripheral device such as a USB memory is mounted), if the device is started as it is, the peripheral device may fail to be normally recognized, leading to malfunction. Although it might be considered to perform the POST process again, the time required for the POST process is not reduced in this case. Further, in the technique disclosed in Patent Document 3, since the personal computer device enters the power-saving mode with holding the result of the POST, time reduction cannot be achieved for processes subsequent to the POST process. To be specific, after the device has entered the power-saving mode with holding the result of the POST, when the device is started up next time, the time required for the POST process is reduced, but a subsequent process for starting up the OS (for example, a process of loading an OS program from an HDD into a main memory, and executing the OS program developed in the main memory) should be performed every time. That is, the time required for the OS startup process cannot be reduced.

SUMMARY OF THE INVENTION

Therefore, an object of the present invention is to provide an information processing apparatus, the startup time of which can be reduced.

The present invention has the following features to attain the object mentioned above.

A first aspect of the present invention is directed to an information processing apparatus including a nonvolatile memory, a volatile memory, and a process control section. A startup program, which is required when starting up the information processing apparatus, has previously been stored in the nonvolatile memory. The process control section includes a startup command reception section, a determination section, a startup program loading section, an execution section, a stop command reception section, and a stop control section. The startup command reception section receives a command to start up the information processing apparatus. The determination section determines whether or not the startup program is present in the volatile memory, when the startup command reception section receives the startup command. The startup program loading section reads the startup program from the nonvolatile memory and writes the same into the volatile memory, only when the determination section determines that the startup program is not present in the volatile memory. The execution section executes the startup program which is written in the volatile memory. The stop command reception section receives a command to stop operation of the information processing apparatus. The stop control section causes the information processing apparatus to stop the operation, by stopping supply of power to other components of the information processing apparatus than the volatile memory while maintaining supply of power to the volatile memory, when the stop command reception section receives the operation stop command.

Thus, according to the first aspect, it is possible to reduce the time required for startup of the information processing apparatus.

In a second aspect based on the first aspect, when the stop command reception section receives the operation stop command, the stop control section reads the startup program from the nonvolatile memory and writes the same into the volatile memory, and thereafter, stops supply of power to other components of the information processing apparatus than the volatile memory while maintaining supply of power to the volatile memory.

Thus, according to the second aspect, since writing of the startup program into the volatile memory is performed when the operation of the information processing apparatus is stopped, the writing is performed while the user uses the information processing apparatus. Therefore, it is possible to avoid the situation where the processing load of the apparatus is increased when used by the user, resulting in enhanced comfort of the user.

In a third aspect based on the first aspect, the startup program is a startup program for a system operating in the information processing apparatus. The execution section causes the system to start operation, by executing the startup program stored in the volatile memory. Further, when the stop command reception section receives the operation stop command, the stop control section shuts down the system started by the execution section, and then stops supply of power to other components of the information processing apparatus than the volatile memory while maintaining supply of power to the volatile memory. The operation stop command section a command, such as "OS shutdown", to shut dawn a system operating in an information processing apparatus, but it does not mean a command to make the device enter a power-saving mode, such as "sleep mode" or "hibernation". That is it means a command which requires a startup process to be executed when the device is powered on at next startup of the device.

Thus, according to the third aspect, it is possible to reduce the time required until the system operating in the information processing apparatus is started up.

In a fourth aspect based on the third aspect, the process control section further includes a power-saving mode transition section for causing the information processing apparatus to enter a power-saving mode while maintaining the state of the system being operated.

Thus, according to the fourth aspect, it is possible to use, in combination, the shutdown process that allows a reduction in the startup time of the information processing apparatus, and the power-saving mode that temporarily stops the operation of the system without shutting down the system. As a result the convenience of the user can be enhanced.

In a fifth aspect based on the first aspect, the information processing apparatus further includes a remaining battery power detection section for detecting a remaining power of a battery mounted in the information processing apparatus. The process control section stops supply of power to the volatile memory when the remaining battery power detection section determines that the remaining power of the battery is less than a predetermined value, after the operation of the information process apparatus is stopped by the stop control section and before the startup command is received.

Thus, according to the fifth aspect, malfunction of the information processing apparatus is avoided. Further, since the supply of power to the volatile memory is stopped before the battery runs out, the battery life can be increased.

In a sixth aspect based on the first aspect, a ROM, in which a loader program for executing the determination section and the startup program loading section has previously been stored, is embedded in the process control section. When the startup command reception section receives the startup command, the process control section executes the loader program stored in the ROM.

Thus, according to the sixth aspect, the startup time can be further reduced.

In a seventh aspect based on the first aspect, the information processing apparatus further comprises a power control section for controlling, individually, a first power supply line for supplying power to the process control section, a second power supply line for supplying power to the volatile memory, and a third power supply line for supplying power to other components of the information processing apparatus than the volatile memory and the process control section.

Thus, according to the seventh aspect, the operation of the information processing apparatus can be stopped while maintaining supply of power to the volatile memory independently.

In an eight aspect based on the first aspect, the volatile memory is a pseudo SRAM.

The pseudo SRAM has a relatively large capacity per unit area, and is relatively low in cost. Recently, the pseudo SRAM realizes low power consumption. It is particularly effective to combine the first aspect with an information processing apparatus having such pseudo SRAM as a volatile memory. In the first aspect, supply of power to the volatile memory is continued even after the stop command reception section has received the operation stop command. Therefore, when the low-power-consumption pseudo SRAM is used as the volatile memory, power consumption in the volatile memory after the stop command can be maintained at relatively low cost. Further, it is more preferable to combine the first aspect with a hand-held apparatus (for example, a hand-held game apparatus, a cellular phone, a hand-held information terminal, and the like) having a pseudo SRAM as a volatile memory and a battery as a power supply. The hand-held apparatus having a battery as a power supply is severe in power consumption. Further, the hand-held apparatus is generally required to have a memory arranged in a small area, and to be manufactured at low cost. Accordingly, by combining the first aspect with the hand-held apparatus using a pseudo SRAM as a volatile memory, it is possible to realize, at relatively low cost, a hand-held apparatus which has a volatile memory having a large capacity relative to its area, is low in power consumption, and yet has short startup time.

A ninth aspect of the present invention is directed to a computer-readable storage medium for storing a startup/shutdown control program to be executed by a computer of an information processing apparatus comprising a nonvolatile memory in which a startup program to be required for starting up the information processing apparatus has previously been stored, and a volatile memory. The computer is caused to function as a startup command reception section, a determination section, a startup program loading section, an execution section, a stop command reception section, and a stop control section. The startup command reception section receives a command to start up the information processing apparatus. The determination section determines whether or not the startup program is present in the volatile memory, when the startup command reception section receives the startup command. The startup program loading section reads the startup program from the nonvolatile memory and writes the same into the volatile memory, only when the determination section determines that the startup program is not present in the volatile memory. The execution section executes the startup program which is written in the volatile memory. The stop command reception section receives a command to stop operation of the information processing apparatus. The stop control section causes the information processing apparatus to stop the operation, by stopping supply of power to other components of the information processing apparatus than the volatile memory while maintaining supply of power to the volatile memory, when the stop command reception section receives the operation stop command.

Thus, according to the ninth aspect, the same effect as that of the first aspect can be obtained.

A tenth aspect of the present invention is directed to a method for controlling startup/shutdown of an information processing apparatus comprising a nonvolatile memory in which a startup program to be required for starting up the information processing apparatus has previously been stored, and a volatile memory. The method includes a startup command reception step, a determination step, a startup program loading step, an execution step, a stop command reception step, and a stop control step. The startup command reception step receives a command to start up the information processing apparatus. The determination step determines whether or not the startup program is present in the volatile memory, when the startup command reception step receives the startup command. The startup program loading step reads the startup program from the nonvolatile memory and writes the same into the volatile memory, only when the determination step determines that the startup program is not present in the volatile memory. The execution step executes the startup program which is written in the volatile memory. The stop command reception step receives a command to stop operation of the information processing apparatus. The stop control step causes the information processing apparatus to stop the operation, by stopping supply of power to other components of the information processing apparatus than the volatile memory while maintaining supply of power to the volatile memory, when the stop command reception step receives the operation stop command.

According to the present invention, the startup time of the information processing apparatus can be reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

The following will describe embodiments of the present invention with reference to the drawings. The present invention is not limited by the embodiments.

Figure 2:
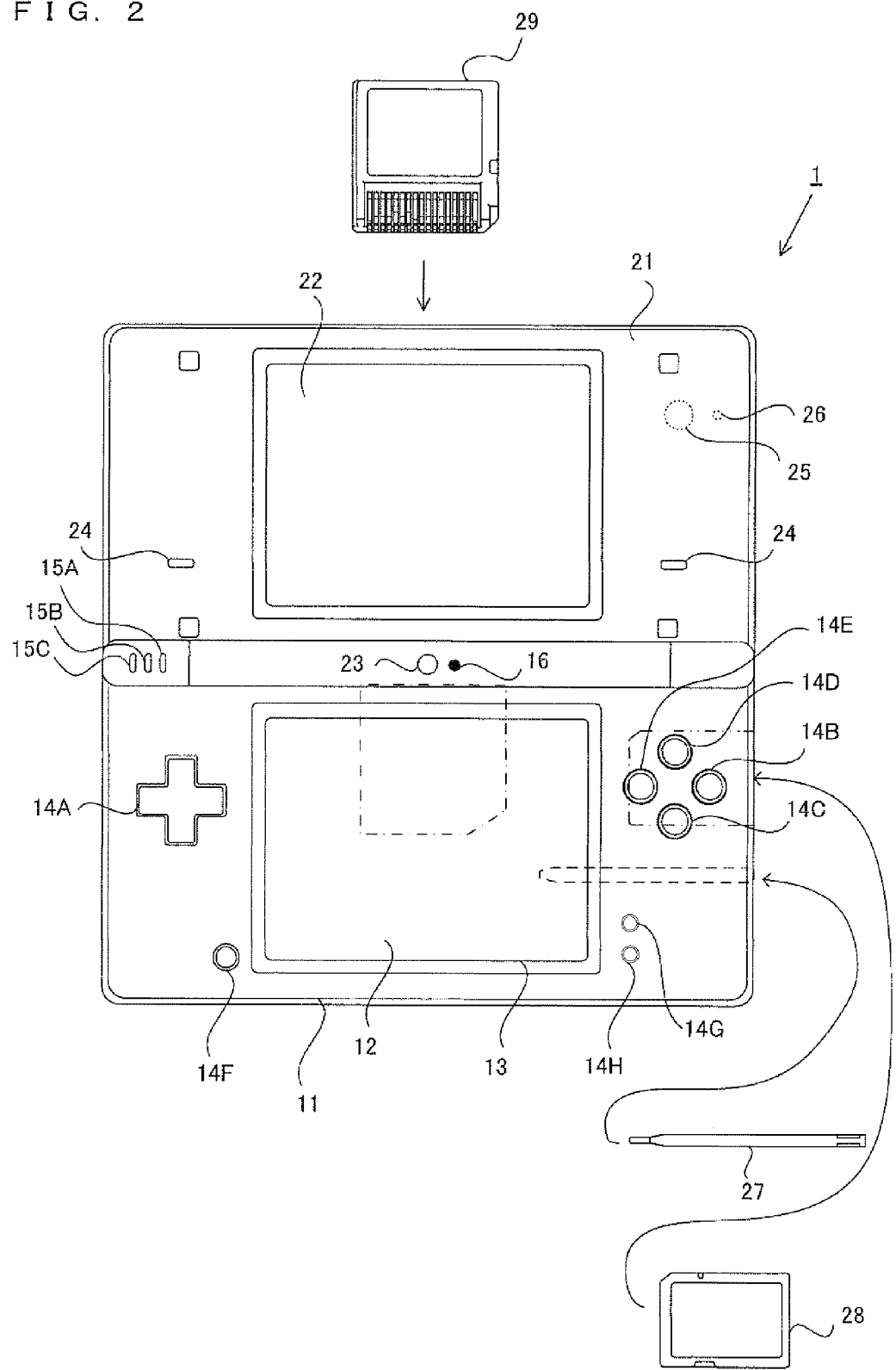
FIG. 2 is an external view of a hand-held game apparatus 1.

First of all, an outline of a startup/shutdown control process of an information processing apparatus, which is assumed in the present embodiment, will be described. In the present embodiment, a hand-held type game apparatus (hereinafter, referred to as a hand-held game apparatus) as shown in FIG. 2 to be described later is adopted as an example of the information processing apparatus. In the hand-held game apparatus, when an operation to turn on its power (i.e., an operation to start up the hand-held game apparatus 1) is performed, a startup process is performed according to a startup sequence as follows. First, when the power-on operation is performed, a boot loader program (hereinafter, referred to simply as a loader) is executed. The loader is a program to be executed first when the power-on operation is performed. Then, a firmware, which is a program corresponding to an OS of the hand-held game apparatus, is called from the loader, and executed. The loader has previously been stored in a ROM embedded in a CPU unit (a ROM 33 embedded in the CPU unit shown in FIG. 3 to be described later). Further, the firmware has previously been stored in a nonvolatile memory to be described later. When executing the firmware, the firmware is read from the nonvolatile memory and stored (loaded) in a volatile memory. Then, the CPU unit of the hand-held game apparatus accesses the volatile memory, and executes the firmware in the volatile memory. When the firmware is executed, an initial menu of the hand-held game apparatus is displayed on a screen, and the apparatus enters a state of waiting for user operation.

In the present embodiment, when an operation to turn off the power of the hand-held game apparatus (i.e., an operation to shut down the hand-held game apparatus 1) is performed, a process of loading the firmware into the volatile memory is performed, and then a shutdown control to turn off the power of the hand-held game apparatus is performed with the volatile memory being maintained in its on state. Consequently, when the apparatus is powered on next time, the firmware has already been loaded into the volatile memory. Therefore, the above-described process of "reading the firmware from the nonvolatile memory and writing the same into the volatile memory" is skipped, thereby reducing the startup time of the hand-held game apparatus. For example, typically, an operation as follows can be assumed. First of all, it is assumed that a user has purchased a hand-held game apparatus, and turned on power for the first time (note that the hand-held game apparatus according to this embodiment uses a rechargeable battery as a power supply). At the time of such "first startup", execution of the firmware is started after the process of reading the firmware from the nonvolatile memory and writing the same into the volatile memory. In the hand-held game apparatus according to the present embodiment, an initialization process (user registration, time adjustment, and the like) is executed at the time of the "first startup". When the initialization process is completed, the initial menu of the hand-held game apparatus is displayed. From the initial menu, the user can execute a desired game program or the like to play the same. After the user has played the game program, the user performs an operation to turn off the power of the hand-held game apparatus. Then, the firmware is loaded into the volatile memory, and a control to turn off the power of the hand-held game apparatus is executed with the volatile memory being maintained in its on state. At the next and subsequent power-on of the hand-held game apparatus, the firmware is executed immediately after execution of the loader, whereby the startup time of the hand-held game apparatus (the time required until the initial menu is displayed) is reduced as compared with that at the first startup, and it seems to the user that the initial menu is displayed immediately after the user performs the power-on operation. As a result, it is possible to prevent the user from having an impression of "being made to wait for startup" when the hand-held game apparatus is started up.

Figure 1:
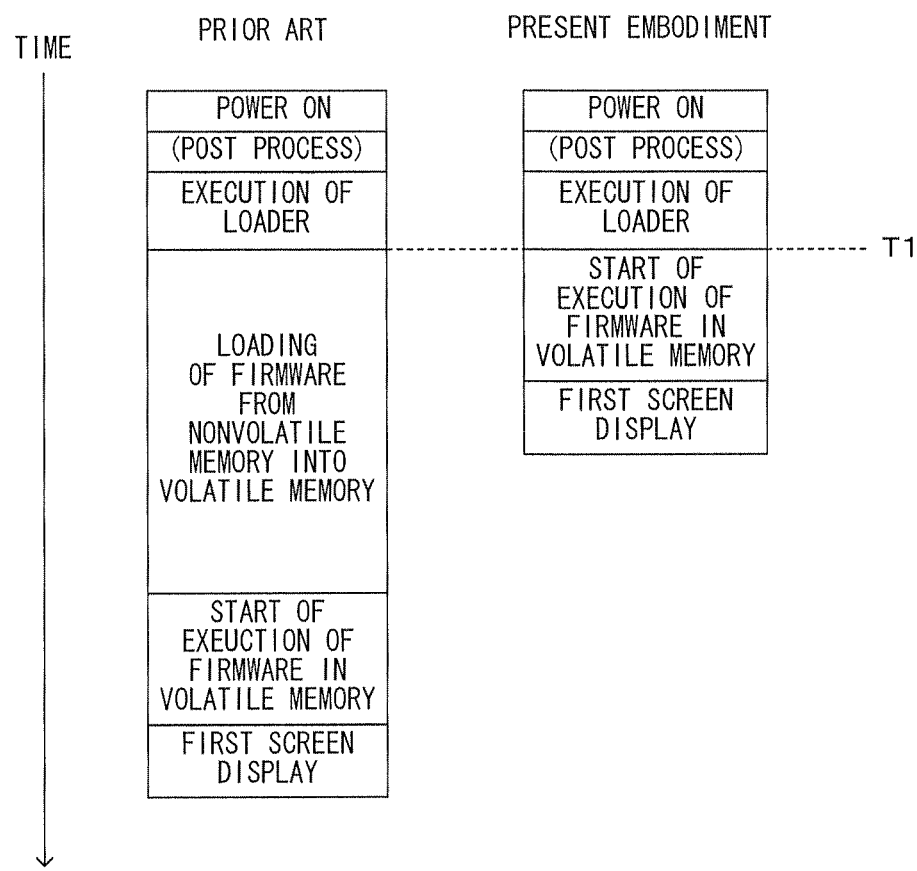
FIG. 1 is a diagram illustrating a startup process and a startup time according to an embodiment of the present invention.

FIG. 1 shows a difference between the startup process and startup time according to the present embodiment, and those of the conventional apparatus. In FIG. 1, the time axis is taken in the vertical direction. Further, in FIG. 1, the conventional startup process is schematically shown on the left side, while the startup process according to the present embodiment (to be precise, the startup process relating to the second (and subsequent) startup after the first startup) is schematically shown on the right side.

The conventional startup process is performed through the following steps: power-on→(execution of POST if necessary→) execution of the loader→reading of the firmware from the nonvolatile memory and writing of the same into the volatile memory (i.e., loading of the firmware)→execution of the firmware stored in the volatile memory→display of the initial menu. From the viewpoint of the memory access speed of the CPU, it is general that, when executing the firmware, the firmware is loaded from the nonvolatile memory into the volatile memory and then the CPU accesses the volatile memory to execute the firmware. Therefore, the process of loading, into the volatile memory, the firmware stored in the nonvolatile memory is a process that is indispensable for execution of the firmware in principle. Further, it is general that such loading process takes relatively long time.

On the other hand, the startup process according to the present embodiment is identical to the conventional startup process up to the steps of power-on→(execution of POST if necessary→) execution of the loader (timing T1 in FIG. 1). However, in the present embodiment, as described above, the firmware has already been loaded into the volatile memory at the time of power-on. Therefore, the process of loading the firmware from the nonvolatile memory into the volatile memory, which is required every time in the conventional startup process, is dispensed with, and the process of executing the firmware in the volatile memory can be performed immediately after the process of executing the loader is completed. As a result, the startup time of the hand-held game apparatus can be reduced.

As for the firmware to be written in the volatile memory at the time of power-off of the hand-held game apparatus, the whole firmware (all of a plurality of modules configuring the firmware) need not be written, but only a part of the firmware may be written. For example, minimum modules (i.e., a part of the firmware) required for startup of the system may be written in the volatile memory. Alternatively, only modules which are required until any screen display is first performed may be written in the volatile memory at the time of power-off. Other modules than those mentioned above may be arbitrarily loaded from the nonvolatile memory into the volatile memory at the time of next startup. In this case, since, for the eyes of the user, any screen display is performed at almost the same time as the power-on, the user is prevented from having an impression of taking time for (being made to wait for) startup of the game apparatus. Still alternatively, modules which are required until an operation (initial operation) from the user becomes acceptable may be written in the volatile memory at the time of power-off. For example, only modules which are required until the initial menu is displayed to allow a user input maybe written in the volatile memory. As a result, at the time of next startup, the initial menu that is operable by the user is quickly displayed. Other modules maybe read from the nonvolatile memory and written in the volatile memory by utilizing the time until the user operation to the initial menu is actually executed. Yet alternatively, depending on the contents of the firmware, modules which are required until a screen, such as a login screen, that causes the user to enter a user name and a password is displayed may be written in the volatile memory. Also in this case, the time required until a screen which allows any operation of the user can be reduced at the time of next startup, and thereby the user is prevented from having an impression that startup of the information processing apparatus such as the hand-held game apparatus takes time. Hereinafter, for convenience of description, it is assumed that the whole firmware is written in the volatile memory at the time of power-off.

Next, the configuration of the hand-held game apparatus according to the embodiment of the present invention will be described with reference to FIGS. 2 and 3. As shown in FIG. 2, the hand-held game apparatus 1 is a foldable hand-held game apparatus. FIG. 2 shows the hand-held game apparatus 1 in its opened state. The hand-held game apparatus 1 is configured to have such a size as to be held by a user with both hands or one hand.

The hand-held game apparatus 1 includes a lower housing 11 and an upper housing 21. The lower housing 11 and the upper housing 21 are connected to each other so as to be capable of being opened or closed (foldable). In the example of FIG. 2, the lower housing 11 and the upper housing 21 are each formed in a plate-like shape of a horizontally long rectangle, and foldably connected to each other at long side portions thereof. Unusually, the user uses the hand-held game apparatus 1 in the opened state. When not using the hand-held game apparatus 1, the user keeps the hand-held game apparatus 1 in its closed state. In the example shown in FIG. 2, in addition to the closed state and the opened state, the hand-held game apparatus 1 is capable of maintaining an angle between the lower housing 11 and the upper housing 21 at any angle ranging between the closed state and the opened state by frictional force generated at a connection portion, or the like. In other words, the upper housing 21 can be stationary at any angle with respect to the lower housing 11.

In the lower housing 11, a lower LCD (Liquid Crystal Display) 12 is provided. The lower LCD 12 has a horizontally long shape, and is located such that a long side direction thereof corresponds to a long side direction of the lower housing 11. It is noted that although an LCD is used as a display device provided in the hand-held game apparatus 1 in the present embodiment, any other display devices such as a display device using an EL (Electro Luminescence), and the like may be used. In addition, the hand-held game apparatus 1 can use a display device of any resolution. Although details will be described later, the lower LCD 12 is used mainly for displaying an image taken by an inner camera 23 or an outer camera 25 in real time.

In the lower housing 11, operation buttons 14A to 14K and a touch panel 13 are provided as input devices. As shown in FIG. 2, among the operation buttons 14A to 14K, the direction input button 14A, the operation button 14B, the operation button 14C, the operation button 14D, the operation button 14E, the power button 14F, the start button 14G, and the select button 14H are provided on an inner main surface of the lower housing 11 which is located inside when the upper housing 21 and the lower housing 11 are folded. The direction input button 14A is used, for example, for a selection operation, and the like. The operation buttons 14B to 14E are used, for example, for a determination operation, a cancellation operation, and the like. The power button 14F is used for turning on or off the power of the hand-held game apparatus 1. In the example shown in FIG. 2, the direction input button 14A and the power button 14F are provided on the inner main surface of the lower housing 11 and on one of a left side and a right side (on the left side in FIG. 2) of the lower LCD 12 provided in the vicinity of a center of the inner main surface of the lower housing 11. Further, the operation buttons 14B to 14E, the start button 14G, and the select button 14H are provided on the inner main surface of the lower housing 11 and on the other of the left side and the right side (on the right side in FIG. 2) of the lower LCD 12. The direction input button 14A, the operation buttons 143 to 14E, the start button 14G, and the select button 14H are used for performing various operations on the hand-held game apparatus 1.

It is noted that the operation buttons 14I to 14K are omitted in FIG. 2. For example, the L button 14I is provided at a left end of an upper surface of the lower housing 11, and the R button 14J is provided at a right end of the upper surface of the lower housing 11. The L button 14I and the R button 14J are used, for example, for performing a photographing instruction operation (shutter operation) on the hand-held game apparatus 1. In addition, the volume button 14K is provided on a left side surface of the lower housing 11. The volume button 14K is used for adjusting the volume of speakers of the hand-held game apparatus 1.

The hand-held game apparatus 1 further includes the touch panel 13 as another input device in addition to the operation buttons 14A to 14K. The touch panel 13 is mounted on the lower LCD 12 so as to cover a screen of the lower LCD 12. In the present embodiment, the touch panel 13 is, for example, a resistive film type touch panel. However, the touch panel 13 is not limited to the resistive film type, but any press-type touch panel may be used. The touch panel 13 used in the present embodiment has the same resolution (detection accuracy) as that of the lower LCD 12. However, the resolution of the touch panel 13 and the resolution of the lower LCD 12 may not necessarily be the same as each other. In a right side surface of the lower housing 11, an insertion opening (indicated by a dotted line in FIG. 2) is provided. The insertion opening is capable of accommodating a touch pen 27 which is used for performing an operation on the touch panel 13. Although an input to the touch panel 13 is usually performed with the touch pen 27, in addition to the touch pen 27, a finger of the user can be used for operating the touch panel 13.

In the right side surface of the lower housing 11, an insertion opening (indicated by a two-dot chain line in FIG. 2) is formed for accommodating a memory card 28. Inside the insertion opening, a connector (not shown) is provided for electrically connecting the hand-held game apparatus 1 to the memory card 28. The memory card 28 is, for example, an SD (Secure Digital) memory card, and detachably mounted to the connector. The memory card 28 is used, for example, for storing an image taken by the hand-held game apparatus 1, and loading an image generated by another apparatus into the hand-held game apparatus 1.

Further, in the upper surface of the lower housing 11, an insertion opening (indicated by a chain line in FIG. 2) is formed for accommodating a cartridge 29. Inside the insertion opening, a connector (not shown) is provided for electrically connecting the hand-held game apparatus 1 to the cartridge 29. The cartridge 29 is a storage medium storing a color conversion program, a game program, and the like, and detachably mounted in the insertion opening provided in the lower housing 11.

Three LEDs 15A to 15C are mounted to a left side part of the connection portion where the lower housing 11 and the upper housing 21 are connected to each other. The hand-held game apparatus 1 is capable of performing wireless communication with another apparatus, and the first LED 15A is lit up when the power of the hand-held game apparatus 1 is on. The second LED 15E is lit up while the hand-held game apparatus 1 is charged. The third LED 15C is lit up while wireless communication is established. Thus, by the three LEDs 15A to 15C, the power on/off state, the charging state, and the communication establishment state, of the hand-held game apparatus 1, can be notified to the user.

Meanwhile, in the upper housing 21, an upper LCD 22 is provided. The upper LCD 22 has a horizontally long shape, and is located such that a long side direction thereof corresponds to a long side direction of the upper housing 21. Similarly to the lower LCD 12, a display device of another type having any resolution may be used instead of the upper LCD 22. A touch panel may be provided so as to cover the upper LCD 22. For example, on the upper LCD 22, an operation explanation screen is displayed for teaching the user the functions of the operation buttons 14A to 14K and the touch panel 13.

In the upper housing 21, two cameras (the inner camera 23 and the outer camera 25) are provided. As shown in FIG. 2, the inner camera 23 is mounted in an inner main surface of the upper housing 21, in the vicinity of the connection portion. On the other hand, the outer camera 25 is mounted in a surface opposite to the surface in which the inner camera 23 is mounted, namely, in an outer main surface of the upper housing 21 (which is a surface located on the outside of the hand-held game apparatus 101 in the closed state, and a back surface of the upper housing 21 shown in FIG. 2). In FIG. 2, the outer camera 25 is indicated by a dashed line. Thus, the inner camera 23 is capable of taking an image in a direction in which the inner main surface of the upper housing 21 faces, and the outer camera 25 is capable of taking an image in a direction opposite to the imaging direction of the inner camera 23, namely, in a direction in which the outer main surface of the upper housing 21 faces. In this way, in the present embodiment, the inner camera 23 and the outer camera 25 are provided such that the imaging directions thereof are opposite to each other. For example, the user can take an image of a view seen from the hand-held game apparatus 1 toward the user with the inner camera 23 as well as an image of a view seen from the hand-held game apparatus 1 in a direction opposite to the user with the outer camera 25.

In the inner main surface in the vicinity of the connection portion, a microphone (not shown) is accommodated as a voice input device. In the inner main surface in the vicinity of the connection portion, a microphone hole 16 is formed to allow the microphone 42 to detect sound outside the hand-held game apparatus 1. The accommodating position of the microphone 42 and the position of the microphone hole 16 are not necessarily in the connection portion. For example, the microphone 42 may be accommodated in the lower housing 11, and the microphone hole 16 may be formed in the lower housing 11 so as to correspond to the accommodating position of the microphone 42.

In the outer main surface of the upper housing 21, a fourth LED 26 (indicated by a dashed line in FIG. 2) is mounted. The fourth LED 26 is lit up at a time when photographing is performed with the outer camera 25 (when the shutter button is pressed). Further, the fourth LED 26 is lit up while a moving picture is taken by the outer camera 25. By the fourth LED 26, it is notified to an object person whose image is taken and people around the object person that photographing is performed (being performed) by the hand-held game apparatus 1.

Sound holes 24 are formed in the inner main surface of the upper housing 21 and on the left and right sides, respectively, of the upper LCD 22 provided in the vicinity of the center of the inner main surface of the upper housing 21. The speakers are accommodated in the upper housing 21 and at the back of the sound holes 24. The sound holes 24 are holes through which sound from the speakers is released to the outside of the hand-held game apparatus 1.

As described above, provided in the upper housing 21 are the inner camera 23 and the outer camera 25 which are configurations for taking an image, and the upper LCD 22 which is display means for displaying, for example, an operation explanation screen at the time of photographing. On the other hand, provided in the lower housing 11 are the input devices for performing an operation input to the hand-held game apparatus 1 (the touch panel 13 and the buttons 14A to 14K), and the lower LCD 12 which is display means for displaying a game screen. Accordingly, when using the hand-held game apparatus 1, the user can hold the lower housing 11 and perform an input to the input device while viewing an image (an image taken by the camera) displayed on the lower LCD 12.

Hereinafter, an internal configuration of the hand-held game apparatus 1 will be described with reference to FIG. 3. FIG. 3 is a functional block diagram showing the internal configuration of the hand-held game apparatus, and shows only a part of the game apparatus, relating to a power control process of the present embodiment. Therefore, components (for example, the operation button 14, the inner camera 23, the outer camera 25, a GPU, a VRAM, and the like) which are not directly related to the present embodiment are not shown.

Figure 3:
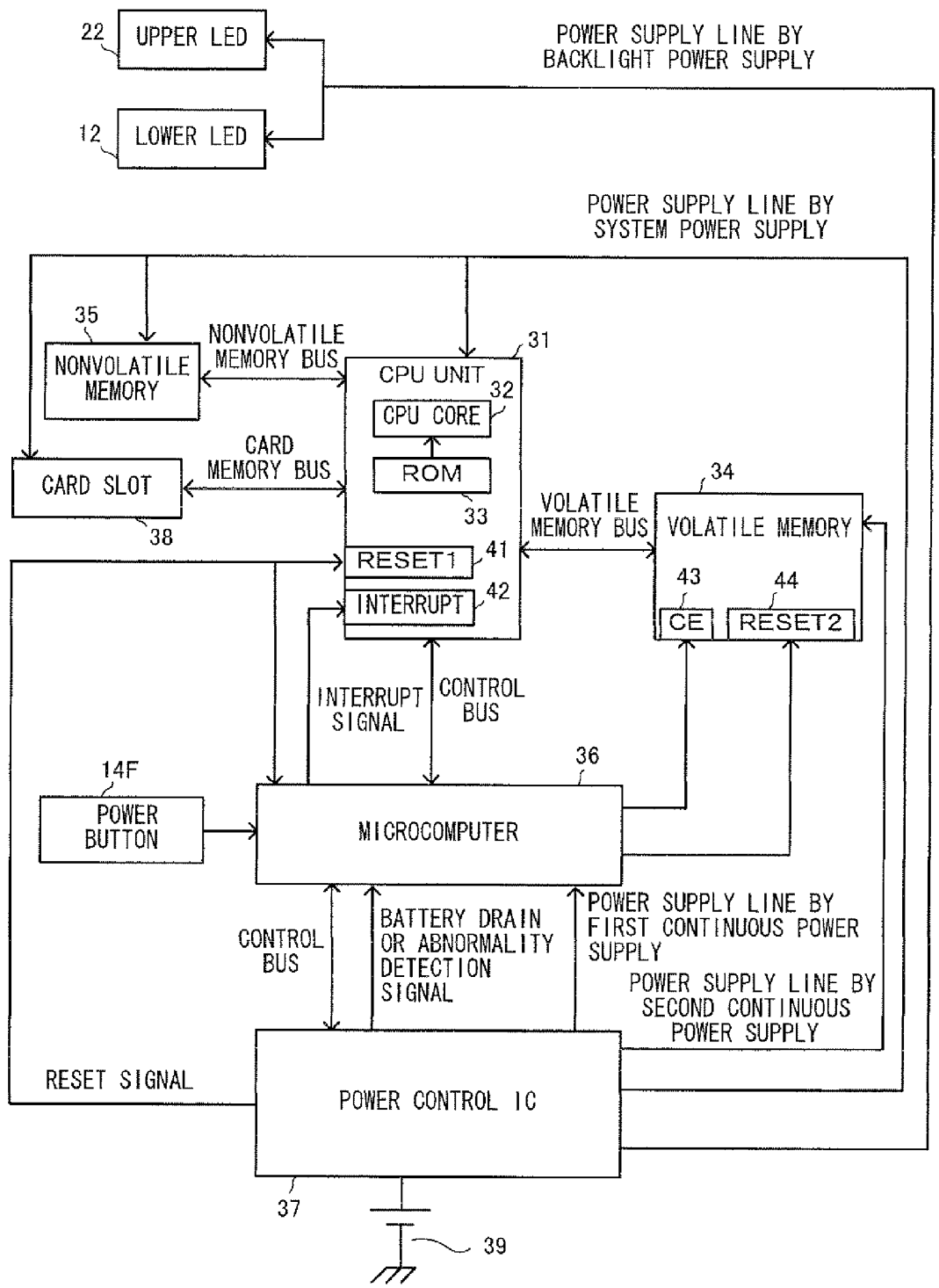
FIG. 3 is a functional block diagram illustrating an example of an internal configuration of the hand-held game apparatus 1.

As shown in FIG. 3, the hand-held game apparatus 1 includes a CPU unit 31, a volatile memory 34, a nonvolatile memory 35, a microcomputer 36, a power control IC 37, a card slot 38, a battery power supply 39, an upper LCD 22, a lower LCD 12, and a power button 14F.

The CPU unit 31 includes a CPU core 32, and a ROM 33 (a ROM embedded in the CPU unit) that is electrically connected to the CPU core 32. The above-described loader has previously been stored in the ROM 33. Therefore, the CPU core 32 can directly access the ROM 33 to execute the loader. Since the loader is stored in the ROM, the loader is prevented from being rewritten illegally. Further, the CPU unit 31 is electrically connected to the volatile memory 34, the nonvolatile memory 35, the card slot 38, the microcomputer 36, and the power control IC 37.

Further, the CPU unit 31 includes a RESET1 terminal 41, and an interrupt terminal 42. When the RESET1 terminal 41 is set at L level in response to a signal from the power control IC 37, the CPU unit 31 is reset. When an interrupt signal is transferred from the microcomputer 36 to the interrupt terminal 42, the CPU unit 31 is allowed to execute an interrupt process. In the present embodiment, for example, when the power button 14F is pressed and held during a game process, a sequence for turning off the power of the hand-held game apparatus 1 is executed as an interrupt process.

Further, the CPU unit 31 can issue a command to the microcomputer 36 by transferring a predetermined control signal via a control bus to the microcomputer 36. The CPU unit 31 can read/write data from/in the volatile memory 34 via a volatile memory bus. The CPU unit 31 can read data from the nonvolatile memory 35 via a nonvolatile memory bus. The CPU unit 31 can read/write data from/in a memory card inserted in the card slot 38, via a card memory bus.

The volatile memory 34 is a memory used as a main memory of the hand-held game apparatus 1, and is constructed of a so-called pseudo SRAM. The volatile memory 34 is connected to the CPU unit 31 via the volatile memory bus. The CPU unit 31 accesses the volatile memory to execute various programs stored (loaded) therein. A pseudo SRAM is a memory adopting DRAM cells as memory cells, and an SRAM interface. The pseudo SRAM according to the present embodiment is provided with, as its operation mode, a power-saving operation mode called a sleep mode.

Further, the volatile memory 34 includes a CE (Chip Enable) terminal 43, and a RESET2 terminal 44. When the CE terminal 43 is set at L level in response to a signal from a microcomputer 36, the volatile memory 34 enters the sleep mode. When the RESET2 terminal 44 is set at L level, the volatile memory 34 is reset.

In the present embodiment, a NAND flash memory is adopted as the nonvolatile memory 35. The nonvolatile memory 35 is connected to the CPU unit 31 via the nonvolatile memory bus. The above-described firmware has previously been stored in the nonvolatile memory 35. The nonvolatile memory 35 may be another semiconductor memory or a magnetic memory.

The power control IC 37 produces a plurality of power supplies described below, from the battery power supply 39 (a rechargeable battery in this embodiment), and supplies powers to the respective components of the hand-held game apparatus 1. The power control IC 37 controls the RESET1 terminal of the CPU unit 31. The power control IC 37 detects the degree of consumption of the battery (remaining battery power). The power supplies generated by the power control IC 37 are as follows.

(1) First Continuous Power Supply

This is a power supply to be generated when the rechargeable battery (battery power supply 39) is mounted, and power is supplied through a line between the power control IC 37 and the microcomputer 36. The power is continuously supplied to the microcomputer 36 so long as sufficient battery power remains.

(2) Second Continuous Power Supply

This is a power supply for supplying power to the volatile memory 34 via a line between the power control IC 37 and the volatile memory 34. In the present embodiment, the power is continuously supplied to the volatile memory by the second continuous power supply so long as sufficient battery power remains.

(3) Backlight Power Supply

This is a power supply for supplying power to backlights of the upper LCD 22 and the lower LCD 12 via lines between the power control IC 37 and the backlights of the respective LCDs 22 and 12.

(4) System Power Supply

This is a power supply for supplying power to the components (in FIG. 3, the CPU unit 31, the nonvolatile memory 35, and the card slot 38) other than the components to which powers are supplied from the first and second continuous power supplies and the backlight power supply, and the power is supplied via lines between the power control IC 37 and these components. In the present embodiment, basically, a state where the system power supply and the backlight power supply are off (a state where supply of power via these lines is stopped) is treated as a state where the power of the hand-held game apparatus is off. Further, a state where the system power supply and the backlight power supply are on (a state where supply of power via these lines is performed) is treated as a state where the power of the hand-held game apparatus is on. In the present embodiment, an operation of pressing the power button 14F for a predetermined period or more is an operation to turn on/off the system power supply. Note that, in the following description, "on/off of the power of the system power supply" means "on/off of the system power supply, which is caused by pressing and holding of the power button 14F", that is, "startup/shutdown of the hand-held game apparatus 1".

The power states of the hand-held game apparatus 1 of the present embodiment includes in addition to the above-described system power on state/off state, "a power-saving standby state" and "a low battery state". The power-saving standby state corresponds to a so-called power-saving mode, and in the present embodiment, it is a state where the system power supply is on while the backlight power supply is off. That is, the backlight power supply which consumes large power is turned off to reduce the power consumption (to save the power) of the whole hand-held game apparatus 1. Further, depending on the contents of an application being executed, generation and supply of internal clocks of the CPU unit 31 may be stopped. In the present embodiment, when the hand-held gate apparatus 1 is closed (when the lower housing 11 and the upper housing 21 are folded), the apparatus enters the power-saving standby state. The low battery state is a state where the second continuous power supply as well as the system power supply and the backlight power supply stop supply of power. In the present embodiment, when the remaining power of the battery mounted in the hand-held game apparatus 1 is less than a predetermined value, a process of causing the game apparatus to enter the low battery state is executed (details will be described later).

The microcomputer 36 mainly performs a process relating to hardware-like power control. The microcomputer 36 can detect that the power button 14F is pressed for a predetermined time or more. Further, the microcomputer 36 can issue a predetermined command to the power control IC 37 via a control bus. To be specific, when the microcomputer 36 detects that the power button 14F is pressed for the predetermined time or more while the system power supply of the hand-held game apparatus 1 is off, the microcomputer 36 issues a startup command to the power control IC. When the microcomputer 36 detects that the power button 14F is pressed for the predetermined time or more while the system power supply of the hand-held game apparatus 1 is on, the microcomputer 36 issues an interrupt command to the CPU unit 31 to cause the CPU unit 31 to execute an interrupt process as a power off sequence. Further, the microcomputer 36 also serves as a clock, and therefore is capable of detecting passage of time after the system power supply is turned off.

The lower LCD 12 and the upper LCD 22 are respectively connected to the CPU unit 31, although not shown in FIG. 3. Each of the lower LCD 12 and the upper LCD 22 displays an image in accordance with an instruction from the CPU unit 31.

The card slot 38 is connected to the CPU unit 31 via the card memory bus. The card slot 38 performs, in accordance with an instruction from the CPU unit 31, reading/writing of data from/in the cartridge 29 inserted in the card slot 38. For example, an application program executable by the hand-held game apparatus 1 is read from the cartridge 29, and stored in the volatile memory 34, and then executed by the CPU unit 31.

Next, the details of processes to be performed in the hand-held game apparatus 1 will be described with reference to FIG. 4 to FIG. 6. A power control process (hardware-like process) for the whole hand-held game apparatus, which is a control mainly related to (associated with) the remaining battery power, will be described first, and thereafter, a system startup/shutdown process to be executed with sufficient battery power will be described.

Figure 4:
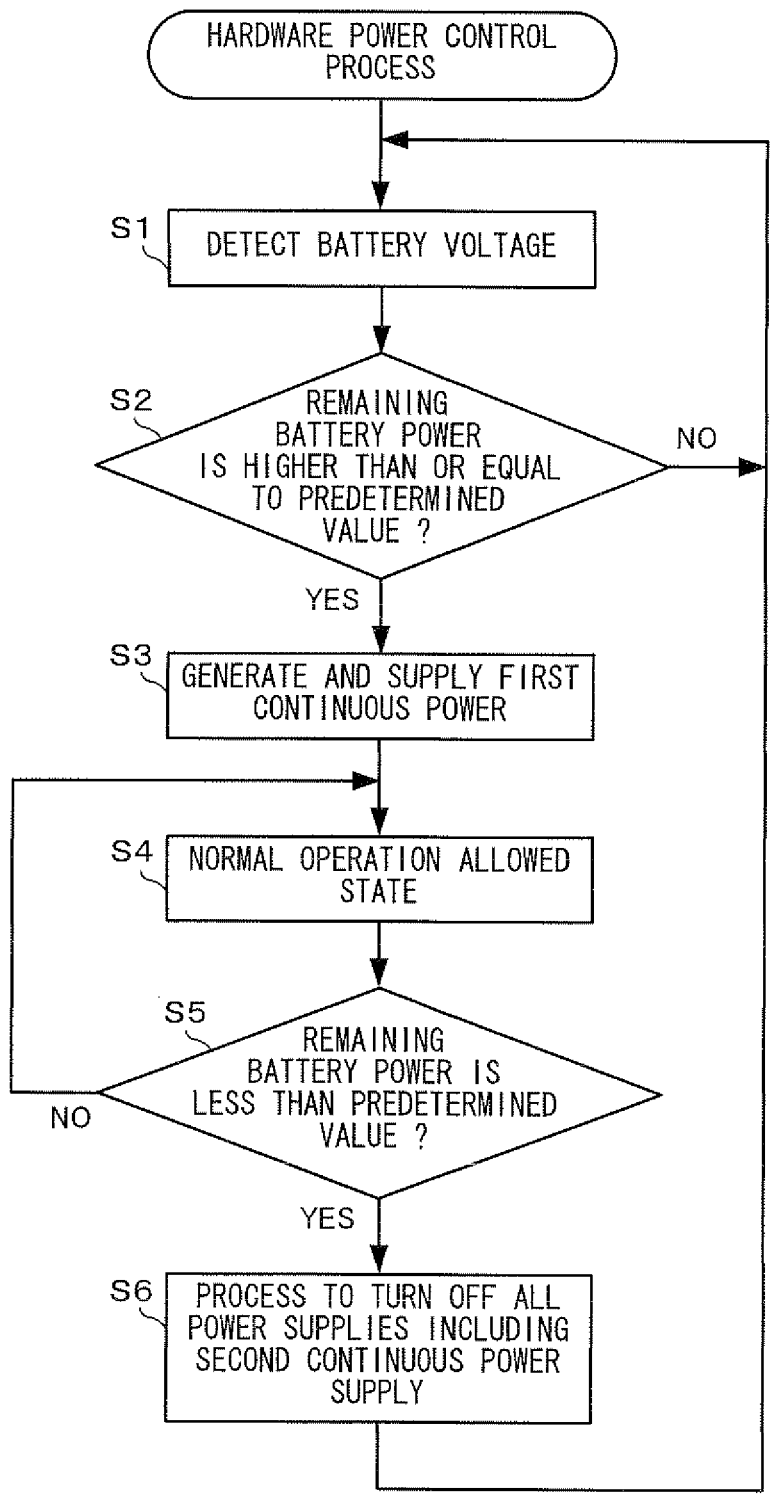
FIG. 4 is a flowchart illustrating details of a hardware power supply control process.

FIG. 4 is a flowchart illustrating the details of the hardware power control process as the whole power control process. When the rechargeable battery (battery power supply 39) is mounted in the hand-held game apparatus 1, a process loop as shown in FIG. 4 is executed.

Initially, in step S1, the power control IC 37 executes a process for detecting the voltage of the mounted battery power supply 39. Next, in step S2, it is determined whether or not the remaining battery power is larger than or equal to a predetermined value. As a result of the determination, when the remaining battery power is not larger than or equal to the predetermined value (NO in step S2), the power control IC 37 returns to step S1 and repeats the above-described processes.

On the other hand, when the remaining battery power is larger than or equal to the predetermined value (YES in step S2), in subsequent step S3, the power control IC 37 generates the first continuous power supply from the battery power supply 39 to perform supply of power to the microcomputer 36.

Next, when supply of power to the microcomputer 36 is started, the hand-held game apparatus 1 enters a normal operation allowed state, in step S4. In this state, the remaining battery power is sufficient for a normal operation of the hand-held game apparatus 1. If an operation of pressing the power button 14F shown in FIG. 2 for a predetermined period or more (i.e., an operation to start up or shut down the hand-held game apparatus 1) is performed during this state, a system startup/shutdown control process to be described later is executed.

Next, in step S5, the power control IC 37 determines whether or not the remaining battery is less than the predetermined value. As a result of the determination, when the remaining battery power is not less than the predetermined value (NO in step S5), that is, when the remaining battery power is sufficient, the power control IC 37 returns to step S4. To be specific, during the normal operation allowed state, a process for monitoring the remaining battery power is continuously performed regardless of on/off of the power of the hand-held game apparatus 1.

On the other hand, as a result of the determination in step S5, when the remaining battery power is less than the predetermined value (YES in step S5), a process for causing the hand-held game apparatus 1 to enter the above-described low battery state (i.e. a process for turning off all the power supplies including the second continuous power supply) is executed in step S6. To be specific, initially the microcomputer 36 sets the RESET2 terminal 44 at L level, and sets the CE terminal 43 at H level. Thereafter, the microcomputer 36 transfers, to the power control IC 37, a command to turn off the power On receipt of the command of power-off, the power control IC 37 stops supply of power by the second continuous power supply. When supply of power by the system power supply and the backlight power supply is being performed (for example, when the user performs, during game play, an operation to turn off the power of the game apparatus 1), the power control IC 37 also stops supply of power by these power supplies. As a result, the firmware stored in the volatile memory 34 is erased simultaneously with stopping of the supply of power. Thereafter, the power control IC 37 returns to step S1 to repeat the above-described processes. Thus, the hardware power control process is completed.

Next, the system startup/shutdown process, which is executed when the power button 14F is pressed for a predetermined period or more during the above-described normal operation allowed state (the state of step S4 in FIG. 4), will be described. FIG. 5 and FIG. 6 are flowcharts illustrating the details of the system startup/shutdown process. In advance of describing the flowcharts shown in FIG. 5 and FIG. 6, it is premised that the hand-held game apparatus is in the above-described normal operation allowed state, and the system power supply is off.

Initially, in step S11, it is determined whether or not an operation to start up the hand-held game apparatus 1 has been performed or not. To be specific, the microcomputer 36 (in the state where the system power supply is off) determines whether or not the power button 14F of the hand-held game apparatus 1 has been pressed for a predetermined period or more. As a result of the determination, when the power button 14F has not been pressed for the predetermined period or more (NO in step S11), the determination in step S11 is repeated.

On the other hand, when it is determined that the power button 14F has been pressed for the predetermined period or more (YES in step S11), a process for starting up the system power supply is executed in step S12. This process in step S12 will be described more specifically. Initially, the microcomputer 36 transfers a startup command to the power control IC 37 via the control bus. Next, the power control IC 37 generates the above-described system power supply from the battery power supply 39, and starts supply of power to the CPU unit 31, the nonvolatile memory 35, the card slot 38, and the like. Further, the power control IC 37 also generates the above-described backlight power supply from the battery power supply 39, and starts supply of power to the upper LCD 22 and the lower LCD 12. At this time, if no power is supplied to the volatile memory 34 (for example, at the first startup or the like), the power control IC 37 also generates the second continuous power supply from the battery power supply 39 and starts supply of power to the volatile memory 34. Thereafter, the power control IC 37 sets the RESET1 terminal 41 of the CPU unit 31 at H level, and simultaneously, sets the terminal of the microcomputer 36 at H level by applying the same signal voltage as that applied to the RESET1 terminal 41. When the RESET1 terminal 41 is at H level, the microcomputer 36 sets, at H level, the CE terminal 43 or the RESET2 terminal 44 of the volatile memory 34, whichever is at L level. As a result, powers are supplied to the respective parts constituting the hand-held game apparatus 1. The microcomputer 36 has already been supplied with power from the first continuous power supply, when the battery power supply 39 is mounted. Further, the volatile memory 34 is continuously supplied with power from the second continuous power supply by a process to be described later, except the first startup of the hand-held game apparatus 1.

Subsequently to the system power supply startup process, the CPU core 32 executes the loader stored in the ROM 33 to execute steps S13 to S15 as follows. Since the loader is stored in the ROM 33 as described above, it is not necessary to load the loader into the volatile memory 34 when it is executed. The CPU core 32 can execute the loader by directly accessing the ROM 33.

Initially, in step S13, it is determined whether or not the firmware is present in the volatile memory 34 (whether or not the firmware has already been loaded). As a result of the determination, when the firmware is not present in the volatile memory 34 (NO in step S13), the firmware stored in the nonvolatile memory 35 is read and written in the volatile memory 34, in step S14. Thereafter, in step S15, execution of the firmware in the volatile memory 34 is started. As a result, an initial menu screen of the hand-held game apparatus 1 is displayed.

On the other hand, as a result of the determination in step S13, when the firmware has already been present in the volatile memory 34 (YES in step S13), the process in step S14 is not executed, but the process in step S15 is executed. That is, the process of loading the firmware into the volatile memory 34 is skipped.

Next, in step S16, a process for executing various programs based on user operation is performed. For example, when the user performs an operation to select a predetermined icon from the initial menu, a process of executing a program (a program for processing a predetermined game) corresponding to the selected icon is performed.

Next, in step S17, it is determined whether or not an operation to cause the hand-held game apparatus 1 to enter the power-saving standby state has been performed. In the present embodiment, the state where the hand-held game apparatus 1 is closed (the state where the lower housing 11 and the upper housing 21 are folded) with the system power supply being on is the power-saving standby state. Therefore, in step S17, it is determined whether or not an operation to fold the hand-held game apparatus 1 has been performed. As a result of the determination, when the operation to cause the game apparatus 1 to enter the power-saving standby state has been performed (YES in step S17), a process for putting the hand-held game apparatus 1 in the power-saving standby state is executed in step S18. To be specific, a control for stopping supply of power by the backlight power supply is performed by the power control IC 37. Further, depending on the contents of the application being executed, generation and supply of internal clocks of the CPU unit 31 may be stopped to achieve further power saving.

After the hand-held game apparatus 1 has entered the power-saving standby state, next, in step S19, it is determined whether or not an operation to cancel the power-saving standby state has been performed. In the present embodiment, an operation to open the folded hand-held game apparatus 1 is the operation to cancel the power-saving standby state. Therefore, it is determined whether or not the operation to open the hand-held game apparatus 1 has been performed. As a result of the determination, when the operation to cancel the power-saving standby state has not been performed (NO in step S19), the determination in step S19 is repeated. On the other hand, when it is determined that the operation to cancel the power-saving standby state has been performed (YES in step S19), a process for canceling the power-saving standby state is executed, and thereafter, the CPU core 32 returns to step S16 to repeat the above-described processes The process of canceling the power-saving standby state is, for example, a process of starting supply of power by the backlight power supply, and restarting supply of internal clocks of the CPU unit 31.

On the other hand, as a result of the determination in step S17, when the operation to cause the hand-held game apparatus 1 to enter the power-saving standby state has not been performed (NO in step S17), next, it is determined, in step S20, whether or not an operation to shut down the hand-held game apparatus 1 (an operation to turn off the power of the hand-held game apparatus 1) has been detected or not. More specifically, it is determined whether or not an operation of continuously pressing the power button 14F for a predetermined period or more has been detected. As a result of the determination, when the operation to shut down the hand-held game apparatus 1 has not been (NO in step S20), the CPU core 32 returns to step S16 to repeat the above-described processes.

On the other hand, when it is determined that the operation to shut down the hand-held game apparatus 1 has been performed (YES in step S20), an interrupt signal is transferred from the microcomputer 36 to the CPU unit 31, and thereby a sequence to turn off the system power supply is executed. To be specific, initially, the same process as in step 214 is executed in step S21. That is, the process of reading the firmware stored in the nonvolatile memory 35, and writing the read firmware in the volatile memory 34 is executed.

Next, in step S22, a process of turning off only the system power supply is executed. This process in step 222 will be described more specifically. Initially, the microcomputer 36 sets the CE terminal 43 at L level to cause the volatile memory 34 enter the sleep mode. Next, the microcomputer 36 transfers a command of power-off to the power control IC 37 via the control bus. On receipt of the command of power-off, the power control IC 37 stops supply of power to only the line of the system power supply. Then, the power control IC 37 sets the RESET1 terminal 41 of the CPU unit 31 at L level. As a result, only the system power supply is turned off, and the power of the hand-held game apparatus 1 is turned off, with the powers from the first and second constant power supplies being continuously supplied (with supply of power to the volatile memory 34 being continued). That is, for the eyes of the user, the power of the hand-held game apparatus 1 is turned off (i.e., the system is shut down), while the state where the firmware is present in the volatile memory 34 is maintained. Thus, the system startup/shutdown process is completed.

As described above, according to the present embodiment, when an operation to turn off the power of the hand-held game apparatus 1 is performed, the firmware is loaded into the volatile memory 34, and a control to turn off the power of the hand-held game apparatus 1 is performed with supply of power to the volatile memory 34 being maintained. Therefore, in the next startup process of the hand-held game apparatus 1, a process of reading the firmware from the nonvolatile memory 35 can be skipped, thereby realizing quick startup. In other words, a process of loading an OS (the firmware in this embodiment) into a volatile memory is a process which is indispensable in a startup sequence for an information processing apparatus, and is expected to provide the same result every time. Such loading process is performed in advance when the system of the information processing apparatus is shut down, so as to be omitted from the startup sequence. As a result, the startup time of the information processing apparatus can be reduced.

Further, since, as a destination into which the firmware is loaded, not a nonvolatile memory such as a flash memory but a volatile memory as described above is adopted, the access speed to the memory is increased as compared with the case of using a flash memory.

Further, in order to realize functions called "standby mode", "sleep mode", and "hibernation", it is necessary to separately provide a process for state saving, such as writing of data indicating the state of the apparatus into a nonvolatile memory or a hard disk. In the present embodiment, however, it is only required to call, during the system shutdown process, the loading process which is generally necessarily performed in the startup sequence. Therefore, from the viewpoint of software implementation, the present embodiment realizes very simple and easy implementation.

Furthermore, the process according to the present embodiment is not a process for causing the hand-held game apparatus 1 to enter the power-saving mode with the system being continuously operated (i.e., without performing the system shutdown process), such as the power-saving standby state of the hand-held game apparatus 1, but a process for turning off the power of the system or a process corresponding to shutdown of the OS, that is, a process that is generally called "power-off" (a shutdown process which needs the startup sequence of the apparatus at the next startup). Therefore, the battery drain can be reduced as compared with the above-described sleep mode and the like, Furthermore, the control according to the present embodiment is not a control for causing the hand-held game apparatus 1 to enter the power-saving mode with the result of the POST process being stored in order to skip the POST process. Therefore, the hand-held game apparatus is not adversely affected by any change in the hardware configuration. Further, it is general that the POST process takes time in an information processing apparatus such as a personal computer in which a variety of hardware are combined and change in the hardware configuration usually occurs. However, it is considered that, in an information processing apparatus such as a hand-held game apparatus exemplified in the present embodiment, a cellular phone, a PDA, or the like, occurrence of change in the hardware configuration, such as in the personal computer, is unusual. Therefore, the POST process does not take much time as compared with the personal computer. Rather, the above-described firmware loading takes longer time. Accordingly, the present invention is particularly useful for a so-called embedded-system information processing apparatus. Further, the present invention is also applicable to electric appliances such as a liquid crystal television, a car navigation apparatus, and the like.

In the above-described embodiment, the process of reading the firmware from the nonvolatile memory 35 and writing the same into the volatile memory 34 is executed when the operation to turn off the system power supply is performed. However, the present invention is not restricted thereto. If the volatile memory 34 has an abundant capacity, apart of the area of the volatile memory 34 may be fixedly allocated as a firmware storage area in order to skip the process of writing the firmware into the volatile memory 34 when the system power supply is turned off. That is, at the time of the first startup of the hand-held game apparatus 1, the firmware is once read from the nonvolatile memory 35 and written into the above-described fixed storage area in the volatile memory 34, and thereafter, the volatile memory 34 is continuously supplied with the power from the second continuous power (except when the remaining battery power is low), whereby the firmware loading process at the time of system shutdown can be skipped. This is advantageous particularly in that the time required for resetting the information processing apparatus can be reduced. Further, the skipping of the writing process can reduce the number of accesses to the nonvolatile memory 35. As a result, the reliability of the nonvolatile memory 35 itself can be enhanced.

Furthermore, in the above-described embodiment, a pseudo SRAM is used as an example of the volatile memory 34. However, the present invention is not restricted thereto. A SRAM, a DRAM, and the like may be used. Using a pseudo SRAM is advantageous in view of cost, and in view of storage capacity in the same die area. Using a SRAM is advantageous in view of access speed and power consumption. Further, in the present embodiment, since supply of power to the volatile memory 34 is maintained even in the state where the power of the hand-held game apparatus 1 is off, it is desired to use, as the volatile memory 34, a memory whose power consumption is relatively low even when maintained in its on state.

Furthermore, in the above-described embodiment, the hand-held game apparatus 1 is adopted as an example of an information processing apparatus, and the firmware is stored in the nonvolatile memory 35. However, the firmware (or OS) may be stored in a storage medium such as a hard disk. Further, the present invention is applicable not only to a hand-held game apparatus but also to a stationary game apparatus that is operated not with a battery but with an AC power supply.

Furthermore, as for the range of the firmware (or OS) to be written in the volatile memory 34 when the system power supply is turned off, it is not necessary to write the whole firmware, but a part of the firmware may be written. This is particularly effective for an OS or the like which is composed of a plurality of modules, has a large file size, and therefore takes time to load. Further, the program to be written in the volatile memory 34 when the system power supply is turned off is not restricted to the firmware and the OS. Any program may be adopted so long as it executes a process that is required every time in the system startup process. That is, the present invention is applicable to general information processing apparatus having a program which needs to be loaded into a volatile memory during a system startup process, and takes time to load.

Figure 5:
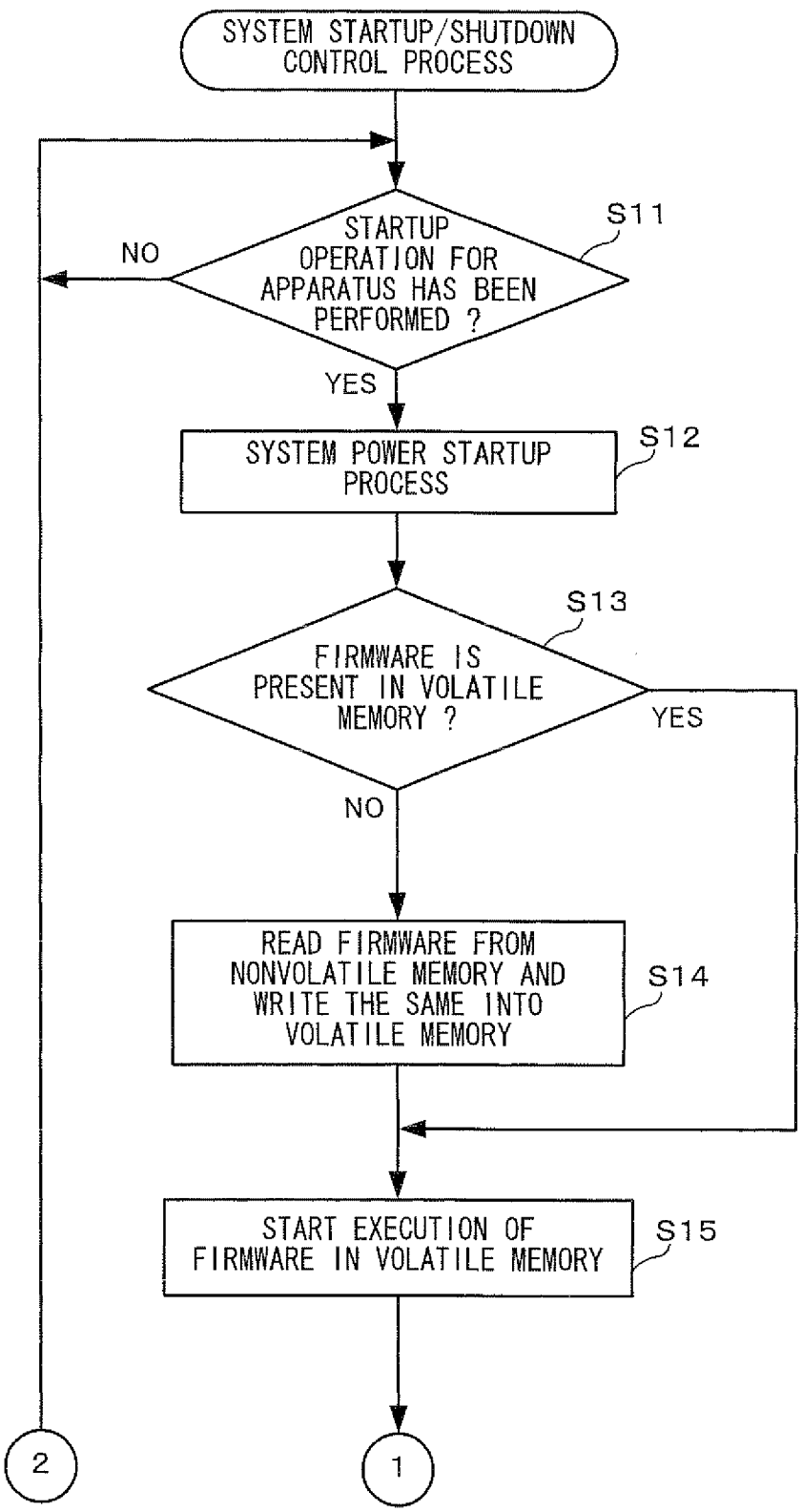
FIG. 5 is a flowchart illustrating details of a system startup/shutdown process.
Figure 6:
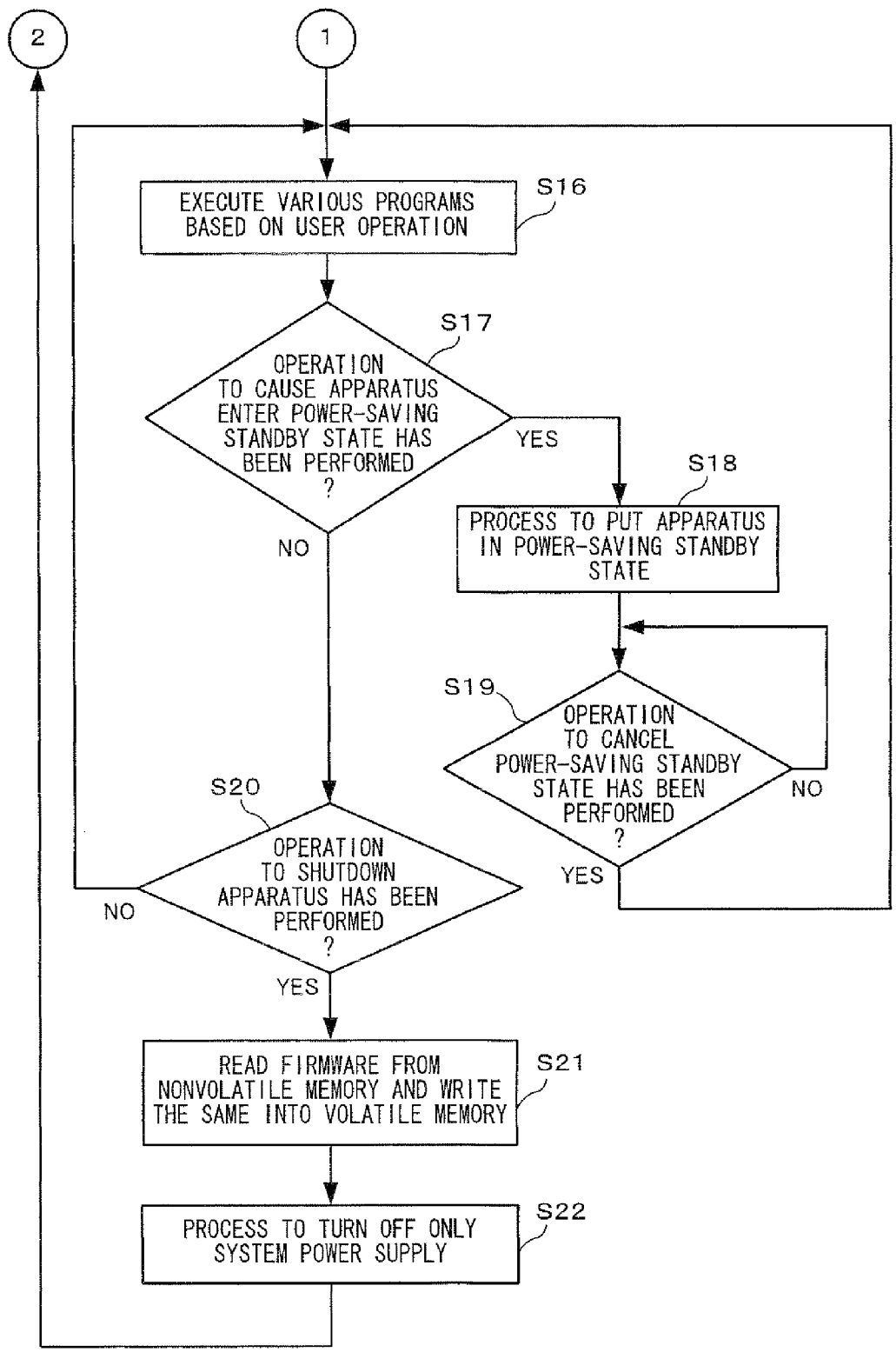
FIG. 6 is a flowchart illustrating details of the system startup/shutdown process.

The processing system/circuitry described in the specification, including the CPU unit 31 and microcomputer 36 (see FIG. 3 in the instant specification), is "programmed" to control the game process in accordance with the "logic" set forth in the exemplary flowcharts of FIGS. 4-6 as described in the specification. One of ordinary skill in the art will therefore recognize that a processing system including at least one CPU when executing instructions in accordance with one of more flowchart blocks operates as "programmed logic circuitry" to perform the operations defined by the flowchart blocks.

While the invention has been described in detail, the foregoing description is in all aspects illustrative and not restrictive. It is understood that numerous other modifications and variations can be devised without departing from the scope of the invention.

What is claimed is:

1. An information processing apparatus comprising a nonvolatile memory, a volatile memory, and a process control device including at least one processor, the nonvolatile memory having previously stored therein a startup program which is required when starting up the information processing apparatus, and the process control device configured to:
   receive a command to start up the information processing apparatus;
   determine whether or not the startup program is present in the volatile memory, when the startup command is received;
   read the startup program from the nonvolatile memory and write the read startup program into the volatile memory, only when the startup program is not present in the volatile memory;
   execute the startup program written in the volatile memory;
   receive a command to stop operation of the information processing apparatus; and
   cause the information processing apparatus to stop the operation, by stopping supply of power to other components of the information processing apparatus than the volatile memory while maintaining supply of power to the volatile memory, when the operation stop command is received, wherein
   the startup program from the nonvolatile memory is written into the volatile memory when the information processing apparatus is caused to stop operation,
   the process control device includes a first process control device configured to at least partially cause the information processing apparatus to stop the operation, and a second process control device configured to at least partially execute the startup program written in the volatile memory,
   the information processing apparatus further comprising:
      a remaining battery power detection device configured to detect a remaining power of a battery mounted in the information processing apparatus; and
      a power control integrated circuit (IC) including a first power supply line configured to supply power to the first process control device, a second power supply line configured to supply power to the volatile memory, and a third power supply line configured to supply power to the second process control device,
   the first process control device further configured to output control signals to the power control IC for power supply control, and
   the first process control device further configured to, when a remaining power of the battery is determined to be lower than a predetermined level by the remaining battery power detection device, output, to the power control IC, a control signal for stopping power supply to the second process control device and the volatile memory while maintaining power supply to the first process control device.

2. The information processing apparatus according to claim 1, wherein
   the startup program is a startup program for a system operating in the information processing apparatus;
   the system is caused to start operation, by executing the startup program stored in the volatile memory; and
   when the operation to stop command is received, the started system is shut down, and then supply of power to other components of the information processing apparatus than the volatile memory is stopped while supply of power to the volatile memory is maintained.

3. The information processing apparatus according to claim 2, wherein the process control device is further configured to cause the information processing apparatus to enter a power-saving mode while maintain the state of the system being operated.

4. The information processing apparatus according to claim 1 further configured to:
   detect a remaining power of a battery mounted in the information processing apparatus; and
   the process control device further configured to stop supply of power to the volatile memory when the remaining power of the battery is less than a predetermined value, after the operation of the information process apparatus is stopped and before the startup command is received.

5. The information processing apparatus according to claim 1, wherein
a ROM, in which a loader program for executing said determining whether or not the startup program is present in the volatile memory, when the startup command is received and said reading the startup program from the nonvolatile memory and writing the read startup program into the volatile memory, only when the startup program is not present in the volatile memory has previously been stored, is embedded in the process control device; and
when the startup command is received, the process control device executes the loader program stored in the ROM.

6. The information processing apparatus according to claim 1, further configured to control, individually, the first power supply line for supplying power to the first process control device, the second power supply line for supplying power to the volatile memory, and the third power supply line for supplying power to the second process control device.

7. The information processing apparatus according to claim 1, wherein the volatile memory is a pseudo SRAM.

8. A non-transitory computer-readable storage medium comprising a startup/shutdown control program to be executed by a computer of an information processing apparatus having at least a process control device and a nonvolatile memory in which a startup program to be required for starting up the information processing apparatus has previously been stored, and a volatile memory, the computer being caused to:
receive a command to start up the information processing apparatus;
determine whether or not the startup program is present in the volatile memory, when the startup command is received;
read the startup program from the nonvolatile memory and writing the read startup program into the volatile memory, only when the startup program is not present in the volatile memory;
execute the startup program written in the volatile memory;
receive a command to stop operation of the information processing apparatus; and
cause the information processing apparatus to stop the operation, by stopping supply of power to other components of the information processing apparatus than the volatile memory while maintaining supply of power to the volatile memory, when the operation stop command is received, wherein
the startup program from the nonvolatile memory is written into the volatile memory when the information processing apparatus is caused to stop the operation,
the process control device includes a first process control device configured to at least partially cause the information processing apparatus to stop the operation, and a second process control device configured to at least partially execute the startup program written in the volatile memory,
the information processing apparatus further comprising:
a remaining battery power detection device configured to detect a remaining power of a battery mounted in the information processing apparatus; and
a power control integrated circuit (IC) including a first power supply line configured to supply power to the first process control device, a second power supply line configured to supply power to the volatile memory, and a third power supply line configured to supply power to the second process control device,
the first process control device further configured to output control signals to the power control IC for power supply control, and
the first process control device further configured to, when a remaining power of the battery is determined to be lower than a predetermined level by the remaining battery power detection device, output, to the power control IC, a control signal for stopping power supply to the second process control device and the volatile memory while maintaining power supply to the first process control device.

9. A method for controlling startup/shutdown of an information processing apparatus comprising a process control device and a nonvolatile memory in which a startup program to be required for starting up the information processing apparatus has previously been stored, and a volatile memory, the method comprising:
receiving a command to start up the information processing apparatus;
determining whether or not the startup program is present in the volatile memory, when a startup command is received;
reading the startup program from the nonvolatile memory and writing the read startup program into the volatile memory, only when it is determined that the startup program is not present in the volatile memory;
executing the startup program written in the volatile memory;
receiving a command to stop operation of the information processing apparatus; and
causing the information processing apparatus to stop the operation, by stopping supply of power to other components of the information processing apparatus than the volatile memory while maintaining supply of power to the volatile memory, when a stop command is received, wherein
the startup program from the nonvolatile memory is written into the volatile memory when the information processing apparatus is caused to stop the operation,
the process control device includes a first process control device configured to at least partially cause the information processing apparatus to stop the operation, and a second process control device configured to at least partially execute the startup program written in the volatile memory,
the information processing apparatus further comprising:
a remaining battery power detection device configured to detect a remaining power of a battery mounted in the information processing apparatus; and
a power control integrated circuit (IC) including a first power supply line configured to supply power to the first process control device, a second power supply line configured to supply power to the volatile memory, and a third power supply line configured to supply power to the second process control device,
the first process control device further configured to output control signals to the power control IC for power supply control, and
the first process control device further configured to, when a remaining power of the battery is determined to be lower than a predetermined level by the remaining battery power detection device, output, to the power control IC, a control signal for stopping power supply to the second process control device and the volatile memory while maintaining power supply to the first process control device.

10. An information processing system, comprising:
at least one nonvolatile memory;
at least one volatile memory; and
at least one process control device including at least one processor, the process control device configured to:
- receive a command to start up the information processing system;
- determine whether or not a startup program is present in the volatile memory, when the startup command is received;
- read the startup program from the nonvolatile memory and write the read startup program into the volatile memory, only when the startup program is not present in the volatile memory;
- execute the startup program written in the volatile memory;
- receive a command to stop operation of the information processing system; and
- cause the information processing system to stop the operation, by stopping supply of power to other components of the information processing system than the volatile memory while maintaining supply of power to the volatile memory, when the operation stop command is received, wherein the startup program from the nonvolatile memory is written into the volatile memory when the information processing apparatus is caused to stop the operation,
the process control device includes a first process control device configured to at least partially cause the information processing apparatus to stop the operation, and a second process control device configured to at least partially execute the startup program written in the volatile memory,
the information processing apparatus further comprising:
- a remaining battery power detection device configured to detect a remaining power of a battery mounted in the information processing apparatus; and
- a power control integrated circuit (IC) including a first power supply line configured to supply power to the first process control device, a second power supply line configured to supply power to the volatile memory, and a third power supply line configured to supply power to the second process control device, the first process control device further configured to output control signals to the power control IC for power supply control, and
the first process control device further configured to, when a remaining power of the battery is determined to be lower than a predetermined level by the remaining battery power detection device, output, to the power control IC, a control signal for stopping power supply to the second process control device and the volatile memory while maintaining power supply to the first process control device.

11. An information processing apparatus comprising a nonvolatile memory, a volatile memory, and a process control device including at least one processor, the nonvolatile memory having previously stored therein a startup program which is required when starting up the information processing apparatus, and the process control device configured to:
- receive a command to start up the information processing apparatus;
- determine whether or not the startup program is present in the volatile memory, when the startup command is received;
- read the startup program from the nonvolatile memory and write the read startup program into the volatile memory, only when the startup program is not present in the volatile memory;
- execute the startup program written in the volatile memory;
- receive a command to stop operation of the information processing apparatus; and
- cause the information processing apparatus to stop the operation, by stopping supply of power to other components of the information processing apparatus than the volatile memory while maintaining supply of power to the volatile memory, when the operation stop command is received, wherein the startup program from the nonvolatile memory is written into the volatile memory when the information processing apparatus is caused to stop operation,
a portion of the volatile memory is allocated in advance as a firmware storage area for the startup program, and
at a first startup of the information processing apparatus, the startup program is written into the portion of the volatile memory allocated in advance as the firmware storage area.

* * * * *